United States Patent [19]

Ito

[11] Patent Number: 5,838,172
[45] Date of Patent: Nov. 17, 1998

[54] TIMING ERROR DETECTING CIRCUIT

[75] Inventor: Hiroshi Ito, Kawasaki, Japan

[73] Assignee: NEC Corporation, Tokyo, Japan

[21] Appl. No.: 767,871

[22] Filed: Dec. 17, 1996

[30] Foreign Application Priority Data

Dec. 27, 1995 [JP] Japan ................................. 7-341635

[51] Int. Cl.$^6$ ................................. H03K 5/13
[52] U.S. Cl. ........................... 327/20; 327/141; 327/291
[58] Field of Search .................................. 327/202, 203, 327/210, 212, 141, 144, 154, 34, 35, 38, 172–176, 291, 299, 20

[56] References Cited

U.S. PATENT DOCUMENTS 5,001,374  3/1991  Chang ..................................... 327/141
5,259,006  11/1993  Price et al. ............................. 327/141

FOREIGN PATENT DOCUMENTS

63-196114  8/1988  Japan ....................................... 327/34
4-335728  11/1992  Japan .

Primary Examiner—Tuan T. Lam
Attorney, Agent, or Firm—Sughrue, Mion, Zinn, Macpeak & Seas, PLLC

[57] ABSTRACT

A timing error detecting circuit detects a timing error of a measurement objective circuit by reading an input data in synchronism with rising or falling of a timing signal and outputting a first output data as a result of the process. The timing error detecting circuit includes a specification insertion circuit for providing an allowable specification value of a delay period relative to the timing signal, a signal processing detecting portion reading the first output data of the measurement objective circuit in synchronism with rising or falling of output of the specification insertion circuit and performing similar process to the measurement objective circuit for outputting a second output data, and a judgement circuit inputting the first and second output data of the measurement objective circuit and the signal processing detecting portion and making judgement of the timing error of the measurement objective circuit in synchronism with rising or falling of the specification insertion circuit. Thus, the timing error detecting circuit makes judgement of occurrence of timing error by the judgement circuit when a signal having the equal level to the data signal input to the measurement objective circuit is not input in synchronism with rising or falling of the output of the specification insertion circuit.

10 Claims, 6 Drawing Sheets

TIMING ERROR DETECTING CIRCUIT

BACKGROUND OF THE INVENTION

1. Field of the Invention

The present invention relates generally to a timing error detecting circuit for a flip-flop circuit or so forth. More specifically, the invention relates to a timing error detecting circuit which detects a region, in which conflict between an input signal and a timing control signal, or so forth is not permissible.

2. Description of the Related Art

As disclosed in Japanese Unexamined Patent Publication (Kokai) No. Heisei 4-335728, the conventional timing error detecting circuit is typically employed as an interface circuit between a circuit terminal device or a termination device for high speed data transmission.

Figure 5:
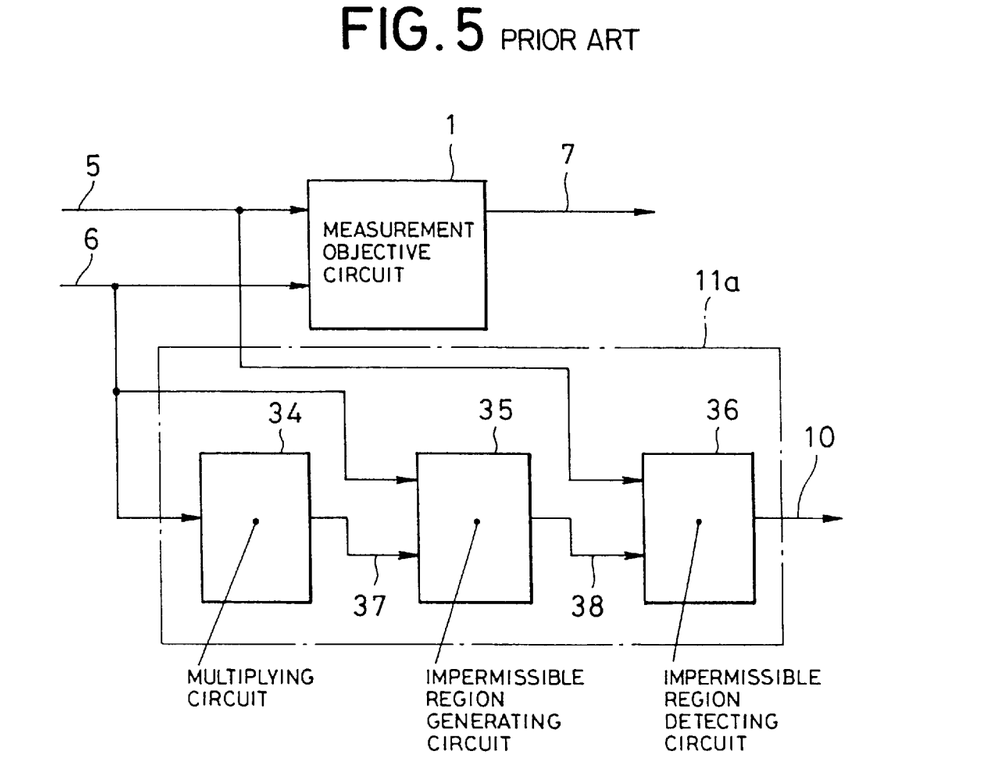
FIG. 5 is a schematic block diagram showing one example of the conventional timing error detecting circuit.

FIG. 5 is a block diagram showing a timing error detecting circuit for explaining one example of the prior art. As shown in FIG. 5, a timing error detecting circuit 11a is provided for a measurement objective circuit 1 constructed with a flip-flop or so forth which reads an input data 5 at a leading edge or a trailing edge of a timing signal 6 as a control signal and outputs an output data 7 related to the input data 5, and has a function for detecting a region where conflict of signals or so forth is not permissible. Namely, the timing error detecting circuit 11a does not check the output data 7 of the measurement objective circuit 1 but checks the impermissible region on the basis of the input data 5 and a timing signal 6. Such timing error detecting circuit 11a includes a multiplying circuit 34 for multiplying, such as doubling, quadrupling or so forth, the timing signal 6, an impermissible region generating circuit 35 which receives the timing signal 6 and a multiplied output 37 of the multiplying circuit 34 and generating a timing impermissible region for determining the leading edge or the trailing edge of the input data 5 as timing error, and an impermissible region detecting circuit 36 inputting the input data 5 and an output signal 38 of the impermissible region generating circuit 35 and outputting a result of detection 10 of error in the impermissible region.

Namely, a primary circuit function of the impermissible region generating circuit 35 is a shift register, and generates the impermissible region utilizing the output of the shift register. On the other hand, the impermissible region detecting circuit 36 is a circuit for detecting the input data 5 rising or falling within the impermissible region generated by the impermissible region generating circuit 35 for judgement of timing error.

Figure 6:
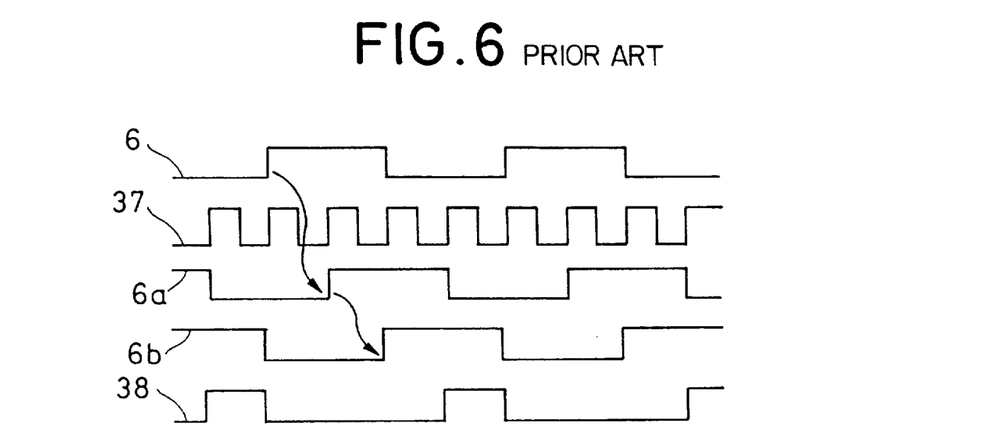
FIG. 6 is a timing chart of various signals upon generation of the impermissible region in FIG. 5.

FIG. 6 is a timing chart of various signals upon generation of the impermissible region in FIG. 5. As shown in FIG. 6, upon generation of the impermissible region by the impermissible region generating portion 35, when a frequency of a signal 37 is generated by the multiplying circuit 34 by multiplying the timing signal 6 by four, an internal signal 6a shifting the timing signal 6 for one stage by the shift register (not shown) of the impermissible region generating circuit 35, and an internal signal 6b shifting the timing signal 6 for two stages are prepared. An AND of an inverted signal of the internal signal 6a and the internal signal 6b is derived as the output signal 38 of the impermissible region generating circuit 35. A high level portion of the output signal 383 is taken as the impermissible region.

In this example, while the signal having a frequency of four times of the timing signal 6 is generated by the multiplying circuit 34, it is not essential to have the frequency of four times of the timing signal and the signal of higher frequency can be used. Higher frequency is preferred for capability of higher precision since the impermissible region can be set painstakingly. When such high frequency signal is used, corresponding shift register may be prepared so that the impermissible region is generated with respect to the leading edge and the trailing edge of the timing signal 6.

On the other hand, the impermissible region detecting circuit 36 has a function to output a high level as the detecting output 10 in responsive to occurrence of variation of rising or falling of the input data 5 is caused upon outputting of high level of the impermissible region of the output signal 38 of the impermissible region generating circuit 35. In short, the impermissible region detecting circuit 36 is a circuit for reading the output signal 38 of the impermissible region generating circuit 35 in synchronism with rising and falling of the input data 5.

When rising or falling of the input data 5 is not within the impermissible region, namely, the measurement objective circuit 1 is not generating the timing error, the impermissible region detecting circuit 36 is read low level of the output signal 38 of the impermissible region generating circuit 35.

Conversely, when the rising or falling of the input data 5 is within the impermissible region and the measurement objective circuit 1 causes timing error, the impermissible region generating circuit 35 read high level of the output signal 38.

Figure 7A:
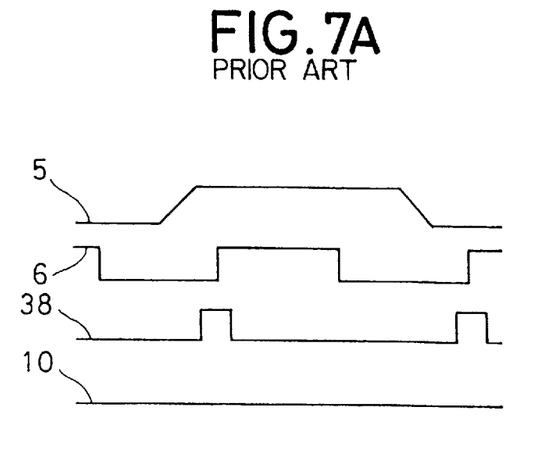
Figure 7B:
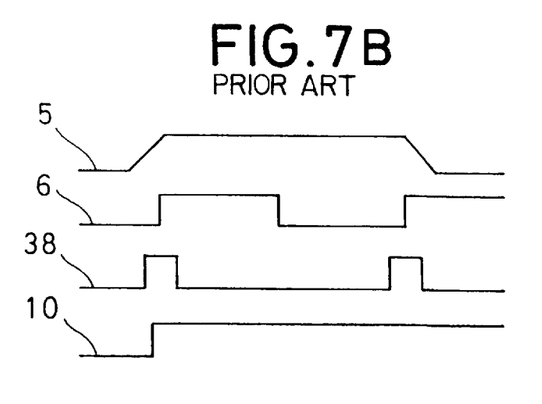

FIGS. 7A and 7B are timing charts of various signals upon non-occurrence of the timing error and occurrence of the timing error in FIG. 5. At first, as shown in FIG. 7A, when the timing error is not caused, rising or falling of the input data 5 falls within a range where the output signal 38 of the impermissible region generating circuit 35 is in low level. This indicates that the output signal 10 of the impermissible region detecting circuit 36 is in low level in this case.

On the other hand, as shown in FIG. 7B, while the timing error is occurring, the leading edge or the trailing edge of the input data 5 is in a range where the output signal 38 of impermissible region generating circuit 35 is high level. In this case, the output signal 10 of the impermissible region detecting portion 36 becomes high level to indicate detection of the timing error.

The conventional timing error detecting circuit as set forth above is designed to generate the impermissible region for making judgement of presence of the timing error at the leading edge or the trailing edge of the input data with respect to the timing signal by providing the impermissible region generating circuit. Furthermore, upon generation of the impermissible region, it becomes necessary to generate high frequency signal by employing the multiplying circuit for multiplying the frequency of the timing signal. Therefore, the impermissible region detecting portion has to operate at high frequency to cause increasing of power consumption on the impermissible region detecting circuit.

Also, in order to generate the impermissible region in the impermissible region generating circuit, it becomes necessary to use a large scale circuit, such as a shift register or so forth to require large number of elements in the impermissible region detecting circuit. For instance, the number of elements in the impermissible region detecting portion has to be at least about 70.

Furthermore, in order to improve precision of error detection, it becomes necessary to set the impermissible region painstakingly. In order to set the impermissible region painstakingly, it is inherent to set the frequency to be generated by the multiplying circuit at higher frequency, and in conjunction therewith, and to employ a shift register corresponding to the increased frequency. Accordingly, increasing of scale of the impermissible region detecting circuit and increasing of power consumption are inevitable.

Furthermore, the conventional timing error detecting circuit only employs the input data and the timing signal and does not monitor the output signal of the measurement objective circuit, for which the timing error is to be detected. Therefore, actual operation of the measurement objective circuit cannot be checked. In this connection, upon generation of the impermissible region, the impermissible region has to be set greater to provide a margin with respect to a timing specification. Namely, a region where judgement of occurrence of error can be made even for a timing, at which the input data can be read in practice, is created.

SUMMARY OF THE INVENTION

Therefore, it is an object of the present invention to provide a timing error detecting circuit which can eliminate necessity of a multiplying circuit and an impermissible region generating circuit which are cause of increasing of number of elements and increasing of power consumption, and can directly perform verification of operation of a circuit to be tested hereinafter referred to as testing objective circuit, and can detect error more accurately.

According to one aspect of the invention, a timing error detecting circuit for detecting a timing error of a measurement objective circuit by reading an input data in synchronism with rising or falling of a timing signal and outputting a first output data as a result of the process, comprises:

a specification insertion circuit for providing an allowable specification value of a delay period relative to the timing signal;

a signal processing detecting portion reading the first output data of the measurement objective circuit in synchronism with rising or falling of output of the specification insertion circuit and per forming similar process to the measurement objective circuit for outputting a second output data; and a judgement circuit inputting the first output data of the measurement objective circuit and the second output data of the signal processing detecting portion and making judgement of the timing error of the measurement objective circuit in synchronism with rising or falling of the specification insertion circuit.

In the preferred construction, the specification insertion circuit is formed with a delay circuit for generating a delay period corresponding to processing period of the measurement objective circuit. The delay period of the specification insertion circuit may be a sum of a reading period of the input data in synchronism with rising or falling of the timing signal, and an allowable value of delay at an occurrence of a phenomenon to cause delay of the reading timing of the measurement objective circuit when variation timing of the input data and a variation timing of the timing signal becomes close, in comparison with a reading timing of the measurement objective circuit when the variation timings of the input data and the timing data are sufficiently different, and a time of a timing specification value of the signal processing detecting portion which constitutes a next stage.

In practice, signal processing detecting portion may be formed with one flip-flop reading the output of the specification insertion circuit as the timing signal upon reading of the first output data of the measurement objective circuit. The judgement circuit may include an EX-OR gate inputting the first output data of the measurement objective circuit and the second output data of the signal processing detecting portion, a delay gate delaying the output of the specification insertion circuit at a given timing, an AND gate for taking AND of the outputs of the EX-OR gate and the delay gate, and a latch circuit for holding an output of the AND gate and outputting a signal as an error detection signal. In this case, the delay gate of the judgement circuit may output a sum of a reading time of the output data of the measurement objective circuit by the signal processing detecting portion in response to the output of the specification insertion circuit and a time for propagating the output signal of the signal processing detecting portion as an output signal of the EX-OR gate, with a delay with respect to the specification insertion circuit.

In the alternative, the signal processing detecting portion may include a first flip-flop circuit, reading the output of the specification insertion circuit as the timing signal upon reading the first output data of the measurement objective circuit, a second flip-flop circuit reading the input data with taking the output of the specification insertion circuit as the timing signal and outputting a third output data, and the judgement circuit inputting the first output data of the measurement objective circuit and second and third output data from the first and second flip-flop circuits and making judgement of timing error in synchronism with the timing signal from the specification insertion circuit. In such case, the second flip-flop circuit of the signal processing detecting portion may read the input data with taking the output of the specification insertion circuit as the timing signal for outputting data having equal level to the input data. Also, the judgement circuit may be a first EX-OR gate inputting the first output data of the measurement objective circuit and the output data of the first flip-flop circuit of the signal processing detecting portion, a second EX-OR gate inputting the first output data of the measurement objective circuit and the third output data of the second flip-flop circuit of the signal processing detecting portion, an OR gate for taking an OR of the outputs of the first and second EX-OR gates, a delay gate for delaying the output of the specification insertion circuit at a given timing, an AND gate for taking an AND of outputs of the OR gate and the delay gate, and a latch circuit for holding output of the AND gate for outputting the error detecting signal. The delay gate of the judgement circuit may output a sum of a reading time of the output data of the measurement objective circuit by the signal processing detecting portion in response to the output of the specification insertion circuit and a time for propagating the output signal of the signal processing detecting portion as output signals of the first and second EX-OR gate, with a delay with respect to the specification insertion circuit.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings:

FIGS. 2A and 2B are timing charts showing various signals in the one embodiment of the timing error detecting circuit of FIG. 1, in which FIG. 2A shows signals upon non-occurrence of a timing error and FIG. 2B shows signals upon occurrence of the timing error;

FIGS. 4A and 4B are timing charts showing various signals in the another embodiment of the timing error detecting circuit of FIG. 3, in which FIG. 4A shows signals upon non-occurrence of a timing error and FIG. 4B shows signals upon occurrence of the timing error;

FIGS. 7A and 7B are timing charts showing various signals in the conventional timing error detecting circuit of FIG. 5, in which FIG. 7A shows signals upon non-occurrence of a timing error and FIG. 7B shows signals upon occurrence of the timing error.

DESCRIPTION OF THE PREFERRED EMBODIMENTS

Next, the preferred embodiments timing control detecting circuit according to the present invention with reference to the accompanying drawings, particularly to FIGS. 1 to 4B. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
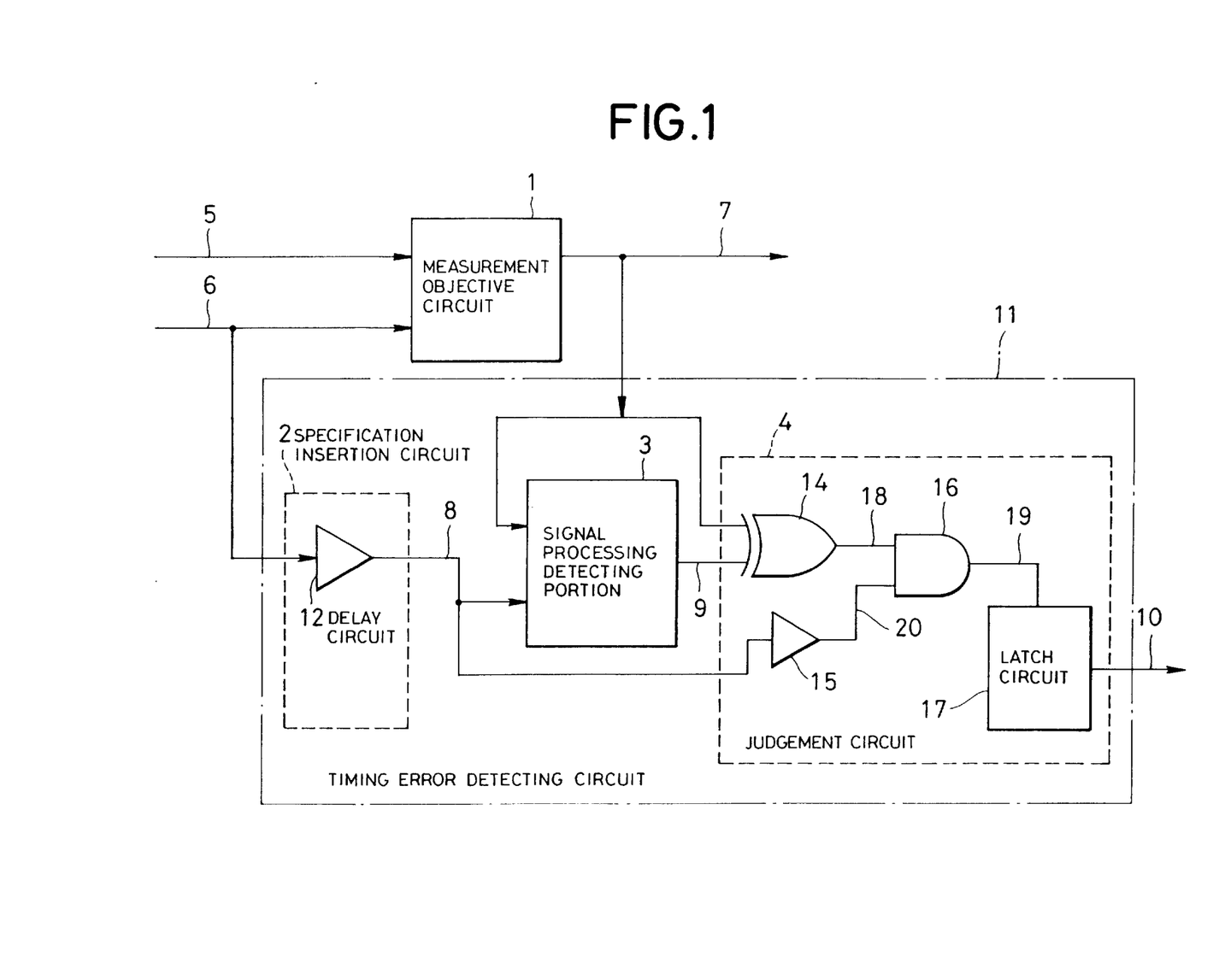
FIG. 1 is a schematic block diagram showing one embodiment of a timing error detecting circuit according to the present invention.

FIG. 1 is a schematic block diagram showing one embodiment of a timing error detecting circuit according to the present invention. The shown embodiment of a timing error detecting circuit 11 is a circuit for detecting a timing error of a circuit 1, for which occurrence of timing error is to be checked (hereinafter referred to as measurement objective circuit) and which measurement objective circuit reads an input data 5 in synchronism with rising or fall of a timing signal 6 and outputs a result of process as a first output data 7, such as a flip-flop or so forth. The timing error detecting circuit 11 is constructed with a delay circuit 12 and so forth, and includes a specification inserting circuit 2 for providing an allowable specification value of a delay time with respect to the timing signal 6, a signal processing detecting portion 3 reading the first output data 7 of the measurement objective circuit 1 in synchronism with rising or falling of an output 8 of the specification insertion circuit 2 and a judgement circuit 4 inputting output data 7 and 9 of the measurement objective circuit 1 and the signal processing detecting portion 3 and making judgement of timing error of the measurement objective circuit 1 in synchronism with rising and falling of the output of the specification insertion circuit 2.

In such timing error detecting circuit 11, the specification insertion circuit 2 is a circuit having a function for generating a delay of reading timing with respect to the timing signal 6, which may be a sum of a reading period of the input data 5 by the measurement objective circuit 1 in synchronism with rising or falling of the timing signal 6 (period from rising or falling of the timing signal 6 to rising of the output data 7), and a delay of reading timing upon occurrence of metastable, namely, an allowable value of delay at the occurrence of phenomenon of causing delay of the reading timing of the measurement objective circuit 1 relative to the reading timing of the measurement objective circuit 1 when variation timing of the input data 5 and the timing signal 6 are sufficiently different, caused by approaching of the variation timing of the input data 5 to the variation timing of the timing signal 6, and a time of a timing specification value of the signal processing detecting portion 3 which is constituted of a next stage flip-flop circuit or so forth (period from rising of data to rising or falling of the timing signal required for setting data). In short, the specification insertion circuit 2 is a circuit formed with the delay circuit 12 for generating the delay period corresponding to a processing period of the measurement objective circuit 1.

On the other hand, the signal processing detecting portion 3 is a circuit for reading the output 8 of the specification insertion circuit 2 as the timing signal, upon reading of the output signal 7 of the measurement objective circuit 1. For example, the signal processing detecting portion 3 is a circuit constructed with one flip-flop circuit reading the data signal in synchronism with rising of the timing signal. At this time, when the measurement objective circuit 1 is a flip-flip circuit reading the input data in synchronism with the input data in synchronism with falling of the timing signal, the signal processing detecting portion 3 also employs the flip-flop circuit reading the data signal in synchronism with falling of the timing signal.

As the signal processing detecting portion 3, employing the flip-flop circuit together with the measurement objective circuit, the operation will be discussed hereinafter.

At first, as initial setting, as the output signal 9 of the signal processing detecting portion 3, a signal of the equal level to the output signal 7 of the measurement objective circuit 1 is output.

Next, in the measurement objective circuit 1, when timing error is not caused between the input data 5 and the timing signal 6, a variation timing of the output signal 7 of the measurement objective circuit 1 to be the data signal of the signal processing portion 3 and a variation timing of the output signal 8 of the delays circuit 12 as the timing signal have an interval corresponding to the timing specification of the signal processing detecting portion 3. Accordingly, the signal processing detecting portion 3 reads the delayed output signal 8 of the delay circuit 12 with taking the signal having the equal level to the input data 5 read in the measurement objective circuit 1, namely the output signal 7 of the measurement objective circuit 1 as the data signal. Therefore, as the output signal 9 of the signal processing detecting portion 3, a signal having the equal level to the output signal 7 of the measurement objective circuit 1 is output.

However, when the timing error is caused in the measurement objective circuit 1 and delay is caused in reading timing of the input data 5 in the measurement objective circuit 1, an interval between the variation timing of the output signal 7 of the measurement objective circuit 1 to be the data signal of the signal processing detecting portion 3 and the variation timing of the output signal 8 of the delay circuit 12 as the timing signal can not satisfy the timing specification of the measurement objective circuit 1 to cause timing error in the signal processing detecting portion 3. Therefore, in the signal processing detecting portion 3, it becomes not possible to read the signal of the equal level to the input data 5 read in the measurement objective circuit. Therefore, the output signal 9 may be different level to that of the output signal 7.

Accordingly, after operation of the signal processing portion 3 in response to the output signal 8 generated in the delay circuit 12, if the timing error is not caused, the output signal 7 of the measurement objective circuit 1 and the output signal 9 of the signal processing detecting portion 3 become the equal level. In contrast to this, when timing error is caused, the output signals 7 and 9 become different levels.

On the other hand, the judgement circuit 4 takes the output signal 7 of the measurement objective circuit 1 and the output signal 9 of the signal processing detecting portion 3 as the inputs and output high level as the judgement output 10 if the levels of the output signals 7 and 9 are different at a timing defined by the output signal 8 of the specification insertion circuit 8, and outputs low level as the judgement output 10 when the levels of the output signal s 7 and 9 are equal to each other.

In concrete, the judgement circuit 4 is constructed with an EX-OR (exclusive OR) gate 14 taking the output signal 7 of the measurement objective circuit 1 and the output signal 9 of the signal processing detecting portion 3, a delay gate 15 for delaying the output signal 8 of the specification insertion circuit 2 for a given delay period, an AND gate 16 for taking AND of the outputs of the EX-OR gate 14 and the delay gate 15, and a latch circuit 17 holding the output of the AND gate 16 and outputs as the judgement output 10 as an error detection signal. The delay gate 15 is adapted to output the sum of the reading timing of the output signal 7 of the measurement objective circuit 1 by the signal processing detecting circuit 3 in response to the output signal 8 of the delay circuit and a propagation period of the output signal 9 of the signal processing detecting circuit 3 as output signal 18 of the EX-OR gate 14, with a delay relative to the output signal 8 of the delay circuit 12. On the other hand, the latch circuit 17 is set at high level only when high level is input as the output signal 19 of the AND gate 16.

The operation of the judgement circuit 4 is as follow.

At first, in the EX-OR gate 14, the level of the output signal 18 becomes high level when the levels of the output signal 7 of the measurement objective circuit 1 and the output signal 9 of the signal processing detecting portion 3 are different, and low level when the levels of the output signals 7 and 9 are equal to each other. Also, the AND gate 16 propagates the output signal 18 of the EX-OR gate 14 as the output signal 19 only when the output signal 20 of the delay gate 15 is high level. Namely, when the signal processing detecting portion 3 operates and after propagation of the output signal 9 thereof is propagated as the output signal 18 of the EX-OR gate 14, the output signal 20 of the delay gate 15 becomes high level to propagate the output signal 19 of the AND gate 16.

Here, when the timing error is not caused in the measurement objective circuit 1, the levels of the output signal 7 of the measurement objective circuit 1 and the output signal 9 of the signal processing detecting portion 3 becomes equal to each other at a timing where the output 20 of the delay gate 15 turns into high level. Then, the output signal 18 of the EX-OR gate 14 becomes low level. Namely, the output signal 19 of the AND gate 16 is held at low level.

On the other hand, when the timing error is caused in the measurement objective circuit 1, at a timing where the output signal 20 of the delay gate 15 turns into high level, the levels of the output signal 7 of the measurement objective circuit 1 and the output signal 9 of the signal processing detecting circuit 3 become different from each other. Thus, the output signal 18 of the EX-OR gate 14 becomes high level to make the output signal 19 of the AND gate 16 high level.

Thus, the latch circuit 17 taking the output signal 19 of the AND gate 16 as the input signal outputs high level as the judgement output 10 only when the timing error is caused. With this judgement output, the timing error of the measurement objective circuit 1 can be detected.

It should be noted that when the measurement objective circuit 1 is a circuit for reading the input data in response to falling of the timing signal, a circuit achieving the equivalent effect can be realized by employing a circuit which outputs an inverted output signal of that of the delay gate 15.

Figure 2A:
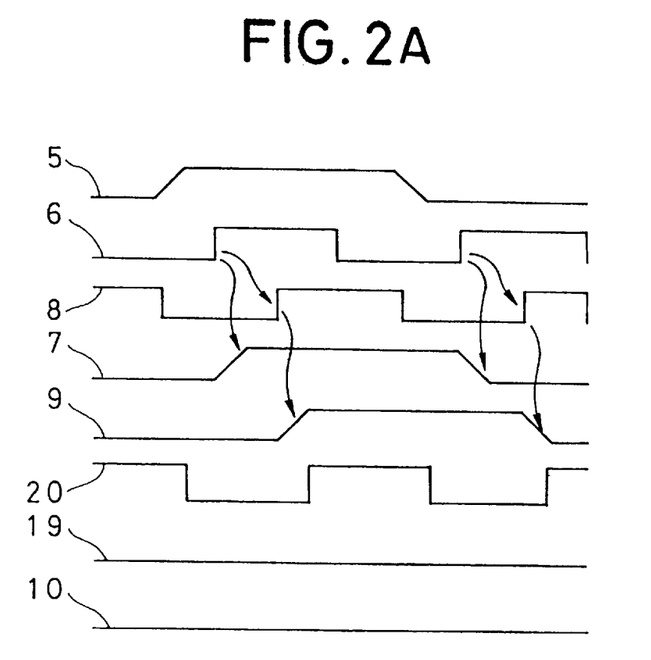
Figure 2B:
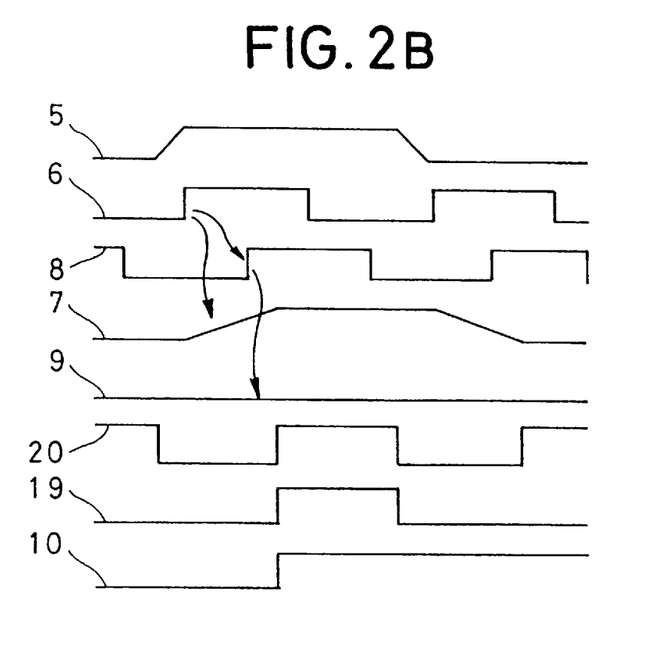

FIGS. 2A and 2B are timing chart showing various signals upon non-occurrence of the timing error and occurrence of timing error in the timing error detecting circuit of FIG. 1. At first, as shown in FIG. 2A, when the timing error is not caused, the judgement circuit 4 reads the output signals 7 and 9 of the measurement objective circuit 1 and the signal processing portion 3. At this time, at the timing where the output signal 20 of the delay gate 15 turns into high level, the levels of the output signal 7 of the measurement objective circuit 1 and the output signal 9 of the signal processing detecting portion 3 are the equal level. Therefore, the latch circuit 17 outputs the low level judgement output 10 to indicate non-occurrence of the timing error.

On the other hand, as shown in FIG. 2B, when the timing error is caused, since the output signal 7 of the measurement objective circuit 1 is delayed due to metastable, the output signal 9 of the signal processing detecting portion 3 cannot be varied. Thus, when the output signal 20 of the delay gate 15 is turned into high level, the levels of the output signal 7 of the measurement objective circuit 1 and the output signal 9 of the signal processing detecting portion 3 are held different. Then, the judgement output 10 of the latch circuit 17 turns into high level to indicate occurrence of the timing error.

In the embodiment set forth above, since the multiplying circuit and the impermissible region generating circuit which are cause of increasing of number of elements in the prior art, can be unnecessary, reduction of number of elements can be achieved. For example, the timing error detecting circuit which has been required about 70 of elements in the prior art, can be realized with about 25 of elements. Also, since the timing error detecting circuit of the shown embodiment is operable at the frequency of the timing signal and does not require the multiplying circuit, power consumption in the signal processing detecting portion can be reduced. For example, in comparison with the conventional circuit employing the multiplying circuit, the power consumption can be lowered to be less than or equal to one fourth. Furthermore, since operation can be directly verified by employing the output signal for error detection, error detection can be much more accurate with respect to the timing specification. Namely, vagueness due to detection of timing error with a margin in the region can be resolved.

In the embodiment set forth above, both of the measurement objective circuit 1 and the signal processing detecting portion 3 are constructed with respective one flip-flop. However, it is possible to construct the timing error detecting circuit according to the present invention with a plurality of flip-flops in one of the measurement objective circuit 1 or the signal processing detecting portion 3. The following another embodiment of the timing error detecting circuit employs two flip-flop circuits (FF circuits) in the signal processing detecting portion 3. Associating with this, the judgement circuit 4 has relatively complicated construction than that in the former embodiment.

Figure 3:
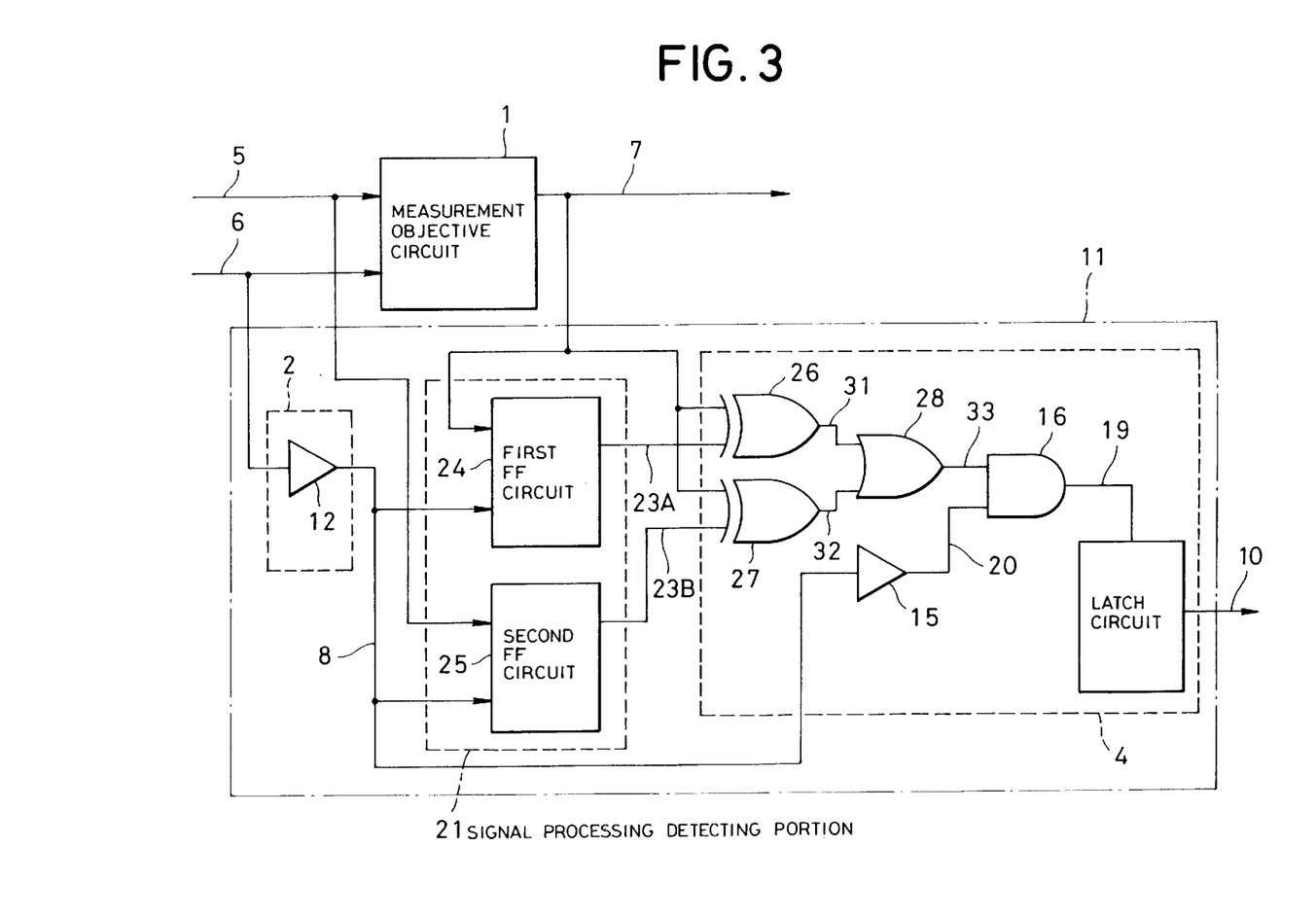
FIG. 3 is a schematic block diagram showing another embodiment of a timing error detecting circuit according to the present invention.

FIG. 3 is a schematic block diagram showing another embodiment of the timing error detecting circuit according to the present invention. As shown in FIG. 3, the shown embodiment of a timing error detecting circuit 11 is constructed with the specification inserting circuit 2 for providing inputting the timing signal 6, a signal processing detecting portion 21 constituted with first and second FF circuits 24 and 25, reading the output data 7 of the measurement objective circuit 1 in and the output signal 8 of the specification insertion circuit 2 and detecting timing error of the measurement objective circuit 1 for outputting detection outputs 23A and 23B, and a judgement circuit 4 inputting the detection outputs 23A and 23B and output signals 7 and 8 of the measurement objective circuit 1 and the specification insertion circuit 2 for outputting the judgement result 10.

The specification insertion circuit 2 of the timing error detecting circuit 11 has the similar function to the circuit of foregoing FIG. 1. Namely, the specification insertion circuit 2 is a circuit having a function for generating a delay of reading timing with respect to the timing signal 6, which may be a sum of a reading period of the input data 5 by the measurement objective circuit 1 in synchronism with rising or falling of the timing signal 6, and a delay of reading timing upon occurrence of the metastable, and the timing specification value of the signal processing detecting portion 21.

On the other hand, the signal processing detecting portion 21 includes the first FF circuit 24 reading the output signal 8 of the specification insertion circuit 2 as the timing signal upon reading the output signal 7 of the measurement objective circuit 1 and outputting the detection output 23A, and the second FF circuit 25 reading the output signal 8 of the specification insertion circuit 2 as the timing signal to output the detection output 23B.

At first, as initial setting, the detection outputs 23A and 23B of the first and second FF circuits 24 and 25 are provided the equal level to an output signal of a FF circuit as the measurement objective circuit 1.

Next, when the timing error is not caused in measurement objective circuit 1, the variation timing of the output signal 7 of the measurement objective circuit 1 to be the data signal and the variation timing of the output signal 8 of the specification insertion circuit 2 as the timing signal in the first FF circuit 24 have an interval corresponding to the timing specification of the first FF circuit 24. Therefore, the first FF circuit 24 reads the signal having the equal level to that of the input data 5 read by the measurement objective circuit 1.

However, in the shown embodiment, there are two modes of timing errors to be caused in the measurement objective circuit 1.

A first timing error mode is a timing error to be caused by metastable. In this case, the basic operation is similar to the circuit operation of the former embodiment as set forth above. When the timing error is caused, when read timing of the input data 5 of the measurement objective circuit 1 is delayed due to metastable, the interval between the variation timing of the output signal 7 of the measurement objective circuit 1 to be the data signal of the first FF circuit 24 and the variation timings of the output signal 8 of the specification insertion circuit 2 does not satisfy the timing specification of the first FF circuit 24 to cause timing error in the first FF circuit 24. Accordingly, the first FF circuit 24 does not read the signal of the equal level to the input data read by the measurement objective circuit 1. Namely, the levels of the output signal 7 of the measurement objective circuit 1 and the detection output 23A of the first FF circuit 24 becomes different.

On the other hand, the second error mode is the error where output signal of the measurement objective circuit 1 does not vary at all. In this case, by occurrence of the timing error, the output signal 7 of the measurement objective circuit 1 to be the data signal of the first FF circuit 24 does not vary. Therefore, the detection output 23A is naturally not varied. Namely, the levels of the output signal 7 of the measurement objective circuit 1 and the detection output 23A of the first FF circuit 24 become equal level.

In short, in the first timing error mode, the first FF circuit 24 outputs the signal having different level to the output signal 7 of the measurement objective circuit 1 and, in the second timing error mode, the first FF circuit 24 outputs the signal having the equal level to the output signal 7 of the measurement objective circuit 1.

Next, in the operation of the second FF circuit 25, irrespective of whether the timing error is caused or not, the variation timing of the output signal 8 of the specification insertion circuit 2 at least satisfies the timing specification of the second FF circuit 25 relative to variation timing of the input data 5 of the FF circuit as the measurement objective circuit 1. Therefore, the output signal 8 of the delay circuit 12 as the timing signal, the input data 5 of the measurement objective circuit 1 can be read. Namely, the second FF circuit 25 outputs the detection output 23B having equal level to the input data 5.

Similarly, the judgement circuit 4 is constructed with a first EX-OR gate 26 inputting the output signal 7 of the measurement objective circuit 1 and the detection output 23A of the first FF circuit 24, a second EX-OR gate 27 inputting the output signal 7 of the measurement objective circuit 1 and the detection output 23B of the second FF circuit 25 of the signal processing detecting portion 21, the OR gate 28 taking OR of the outputs 31 and 32 of the first and second EX-OR gates 26 and 27, the delay gate 15 for delaying the output signal 8 of the specification insertion circuit 2 for a given timing, the AND gate 16 taking AND of outputs 33 and 20 of the OR gate 28 and the delay gate 15, and the latch circuit 17 holding the output signal 19 of the AND gate 16 and outputting the judgement output 10 as the timing error detection signal. The delay gate 15 is adapted to output a sum of the read timing of the output signal 7 of the measurement objective circuit 1 by the signal processing detecting portion 21 in response to the output signal 8 of the delay circuit 12 and a timing to propagate the detection outputs 23A and 23B of the first and second EX-OR gates 26 and 27 as the output signals 31 and 32, with a delay relative to the output signal 8 of the delay circuit 12. When the timing error is judged, the judgement signal 10 becomes high level.

Next, operation of the judgement circuit 4 will be discussed hereinafter. At first, the first EX-OR gate 26 outputs high level as the output signal 31 when the levels of the output signal 7 of the measurement objective circuit 1 as the input signal and the detection output 23A of the first FF circuit 24 are different. The first EX-OR gate 26 outputs low level as the output signal when the levels of the output signal 7 of the measurement objective circuit 1 and the detection output 23A of the first FF circuit 24 are equal to each other. On the other hand, the second EX-OR gate 27 outputs high level output signal 32 when the output signal 7 of the measurement objective circuit 1 and the detection output 23B of the second FF circuit 25 are different, and output low level output signal 32 when the output signal 7 of the measurement objective circuit 1 and the detection output 23B of the second FF circuit 25 are equal to each other. Furthermore, the OR gate 28 outputs high level output signal 33 when at least one of the output signals 31 and 32 of the first and second EX-OR gates 26 and 27 is high level. The AND gate 16 propagates the output signal 33 of the OR gate 28 when the output signal 20 of the delay circuit 15 is high level. Namely, after operation of the first and second FF circuits 24 and 25 and propagation of the detection outputs 23A and 23B to the output signal 33 of the OR gate 28, the output signal 20 of the delay gate 15 turns into high level to propagate the output signal 19 of the AND gate 16.

On the other hand, when the timing error is not caused in the measurement objective circuit 1, at a timing where the output signal 20 of the delay gate 15 is turned into high level, the output signal 7 of the measurement objective circuit 1 and the detection output 23A of the first FF circuit 24 are the equal level. Then, the output signal 31 of the first EX-OR gate 26 becomes low level. At this time, the levels of the output signal 7 of the measurement objective circuit 1 and the detection output 23B of the second FF circuit 25 are the equal level. Therefore, the output signal 32 of the second EX-OR gate 27 is also low level. Thus, since both of the output signals 31 and 32 of the first and second EX-OR gates 27 and 28 are low level, the output signal 33 of the OR gate 28 becomes low level, and thus the output signal 19 of the AND gate 16 becomes also high level.

In the first error mode, when the metastable is caused in the measurement objective circuit 1, at a timing where the output signal 20 of the delay gate 15 turns into high level, the levels of the output signal 7 of the measurement objective circuit 1 and the detection output 23A of the first FF circuit 24 become different. Thus, the first EX-OR gate 26 outputs high level. On the other hand, the levels of the output signal 7 of the measurement objective circuit 1 and the detection output 23B of the second FF circuit 25 become equal to each other. Therefore, the second EX-Or gate 27 outputs low level. Thus, since the output signal 31 of the first EX-OR gate 26 is high level, the output signal 33 of the OR gate 28 becomes high level to cause high level output signal 33 of the AND gate 16.

Also, in the second error mode, namely in the error mode where the output signal of the measurement objective circuit 1 is not varied at all, at the timing where the output signal 20 of the delay gate 15 turns into high level, the levels of the output signal 7 of the measurement objective circuit 1 and the detection output 23A of the first FF circuit 24 become equal level to each other. Then, the first EX-OR gate 26 outputs low level. At this time, the output signal 7 of the measurement objective circuit 1 and the detection output 23B of the second FF circuit 25 have different levels. Thus, the second EX-OR gate 27 outputs high level. Therefore, the output signal 33 of the OR gate 28 becomes high level to cause high level output 19 of the AND gate 16.

In short, the output signal 19 of the AND gate 16 is held low level when no timing error is caused, and becomes high level when the timing error is caused. On the other hand, the latch circuit 17 is input the high level only upon occurrence of the timing error, to output the high level judgement output 10. By this, the timing error of the measurement objective circuit 1 can be detected.

Figure 4A:
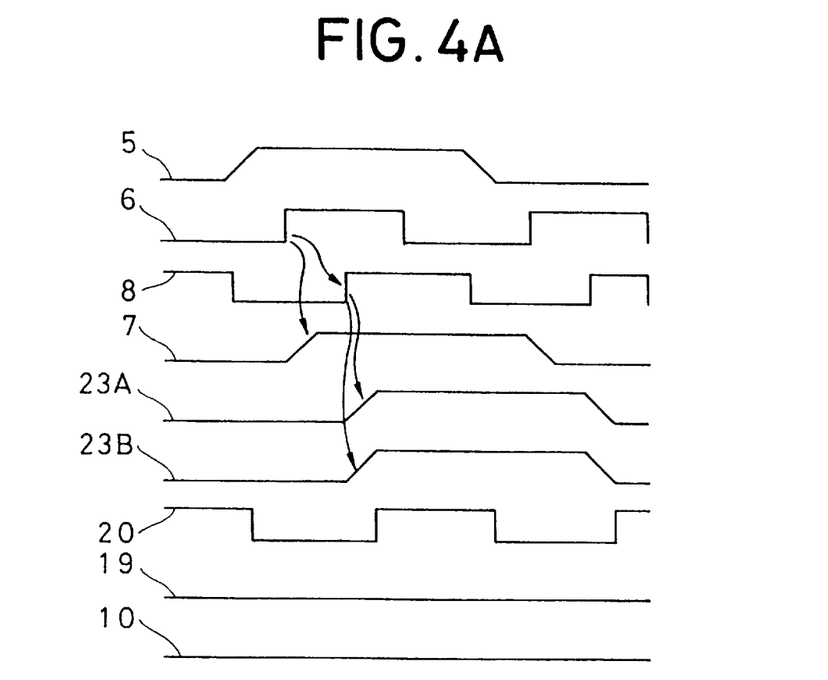
Figure 4B:
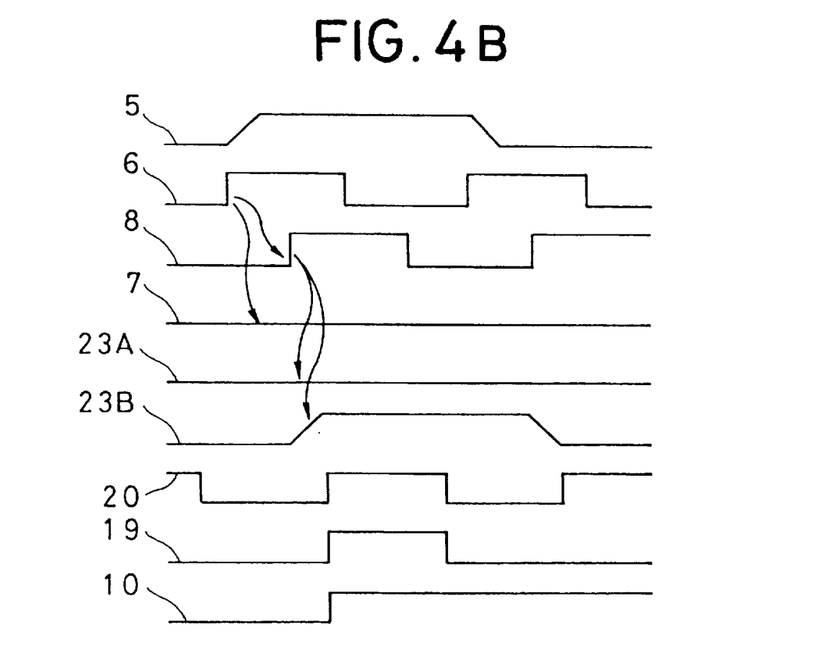

FIGS. 4A and 4B are timing charts showing various signals at non-occurrence of the timing error and at occurrence of the timing error in the timing error detecting circuit of FIG. 3. At first, when the timing error is not caused as shown in FIG. 4A, the output signal 7 of the measurement objective circuit 1 and the detection outputs 23A and 23B of the first and second FF circuits 24 and 25 as read upon turning of the output signal 20 of the delay gate 15 into high level, become equal level to each other. Namely, the judgement output 10 of the latch circuit 17 is held low level to indicate that timing error is not caused.

On the other hand, as shown in FIG. 4B, upon occurrence of the timing error, for example the second mode timing error, since the output signal 7 of the measurement objective circuit 1 does not cause variation, the detection output 23A of the first FF circuit 24 is also not varied. However, since the detection output 23B of the second FF circuit 25 has varied by reading the input data 5, the output signal 20 of the delay gate 15 becomes high level. Therefore, the judgement output 10 of the latch circuit 17 turns into high level to indicate occurrence of the timing error.

As set forth above, the timing error detecting circuit according to the present invention is constructed with the specification insertion circuit providing the allowable specification value of the delay period relative to the timing signal for the measurement objective circuit, the signal processing portion to output an output data through similar process to the measurement objective circuit, and the judgement circuit inputting respective of the output data of the measurement objective circuit and the signal processing detecting portion and making judgement for judgement of the timing error of the measuring objective circuit in synchronism with rising or falling of the output of the specification insertion circuit to permit decreasing of number of elements and decreasing of the power consumption. Also, the timing error detecting circuit which can perform error check accurately, can be realized.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A timing error detecting circuit for detecting a timing error of a measurement objective circuit by reading an input data in synchronism with rising or falling of a timing signal and outputting a first output data as a result of the process, comprising:

a specification insertion circuit for providing an allowable specification value of a delay period relative to said timing signal;

a signal processing detecting portion reading said first output data of said measurement objective circuit in synchronism with rising or falling of output of said specification insertion circuit and performing similar process to said measurement objective circuit for outputting a second output data; and a judgement circuit inputting said first output data of said measurement objective circuit and the second output data of said signal processing detecting portion and making judgement of the timing error of said measurement objective circuit following a rising or falling edge of said output of said specification insertion circuit.

2. A timing error detecting circuit as set forth in claim 1, wherein said specification insertion circuit is formed with a delay circuit for generating said delay period such that it corresponds to a processing period of said measurement objective circuit.

3. A timing error detecting circuit as set forth in claim 2, wherein said delay period of said specification insertion circuit is a sum of a reading period of said input data in synchronism with rising or falling of said timing signal, and an allowable value of delay at an occurrence of a phenomenon to cause delay of a reading timing of said measurement objective circuit when variation timing of said input data and a variation timing of said timing signal becomes close, in comparison with a reading timing of said measurement objective circuit when the variation timings of said input data and said timing signal are sufficiently different, and a time of a timing specification value of said signal processing detecting portion which constitutes a next stage.

4. A timing error detecting circuit as set forth in claim 1, wherein said signal processing detecting portion is formed with one flip-flop reading the output of said specification insertion circuit as a second timing signal upon reading of said first output data of said measurement objective circuit.

5. A timing error detecting circuit as set forth in claim 1, wherein said judgement circuit includes an EX-OR gate inputting said first output data of said measurement objective circuit and said second output data of said signal processing detecting portion, a delay gate delaying the output of said specification insertion circuit at a given timing, an AND gate for taking AND of the outputs of said EX-OR gate and said delay gate, and a latch circuit for holding an output of said AND gate and outputting a signal as an error detection signal.

6. A timing error detecting circuit as set forth in claim 5, wherein said delay gate of said judgement circuit has a delay of a sum of a reading time of the first output data of said measurement objective circuit by said signal processing detecting portion in response to the output of said specification insertion circuit and a time for the outing the second output data of said signal processing detecting portion as an output signal of said EX-OR gate, with a delay with respect to said specification insertion circuit.

7. A timing error detecting circuit as set forth in claim 1, wherein said signal processing detecting portion includes a first flip-flop circuit reading the output of said specification insertion circuit as a second timing signal upon reading said first output data of said measurement objective circuit and outputting said second output data, a second flip-flop circuit reading said input data with taking the output of said specification insertion circuit as said second timing signal and outputting a third output data, and said judgement circuit inputting said first output data of said measurement objective circuit and said second and third output data from said first and second flip-flop circuits and making judgement of timing error in synchronism with said second timing signal from said specification insertion circuit.

8. A timing error detecting circuit as set forth in claim 7, wherein said second flip-flop circuit of said signal processing detecting portion reads said input data with taking the output of said specification insertion circuit as the second timing signal for outputting said third output data having equal level to said input data.

9. A timing error detecting circuit as set forth in claim 7, wherein said judgement circuit is a first EX-OR gate inputting said first output data of said measurement objective circuit and said second output data of said first flip-flop circuit of said signal processing detecting portion, a second EX-OR gate inputting said first output data of said measurement objective circuit and said third output data of said second flip-flop circuit of said signal processing detecting portion, an OR gate for taking an OR of outputs of said first and second EX-OR gates, a delay gate for delaying the output of said specification insertion circuit at a given timing, an AND gate for taking an AND of outputs of said OR gate and said delay gate, and a latch circuit for holding output of said AND gate for outputting an error detecting signal.

10. A timing error detecting circuit as set forth in claim 9, wherein said delay gate of said judgement circuit has a delay of a sum of a reading time of the first output data of said measurement objective circuit by said signal processing detecting portion in response to the output of said specification insertion circuit and a time for propagating the second and third data output of said signal processing detecting portion as output signals of said first and second EX-OR gates, respectively, with a delay with respect to said specification insertion circuit.

* * * * *